April 14, 1936.   B. H. DUVANDER   2,037,409
RELATIVE HUMIDITY AND TEMPERATURE RECORDING APPARATUS
Filed March 7, 1934   3 Sheets-Sheet 1

INVENTOR.
Birger H. Duvander.
BY
Townsend and Loftus.
ATTORNEYS.

April 14, 1936.　　　　B. H. DUVANDER　　　　2,037,409
RELATIVE HUMIDITY AND TEMPERATURE RECORDING APPARATUS
Filed March 7, 1934　　　3 Sheets-Sheet 3
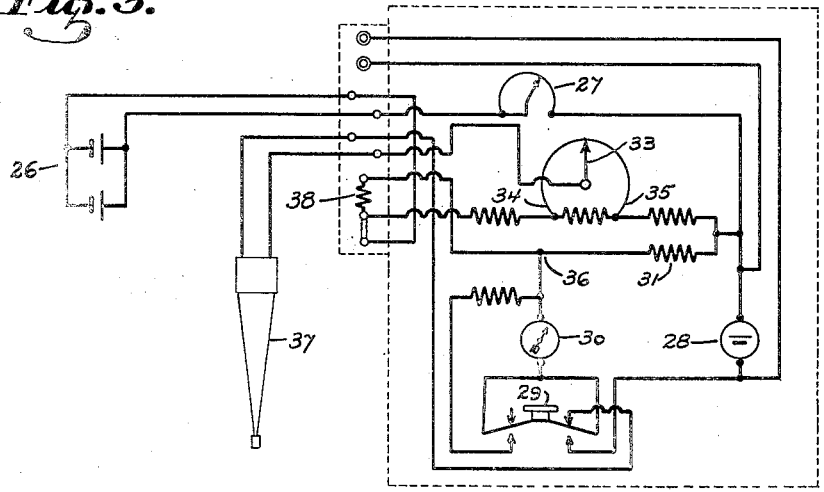
Fig. 3.
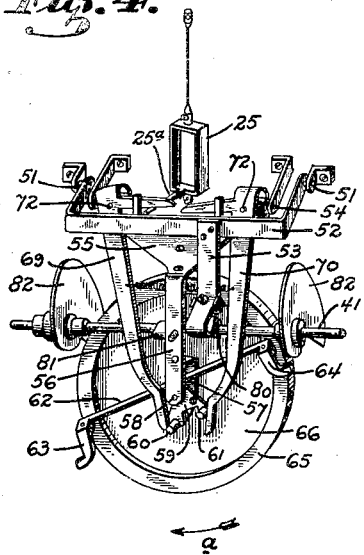
Fig. 4.
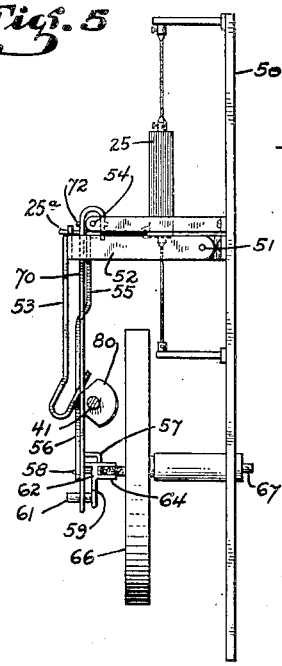
Fig. 5
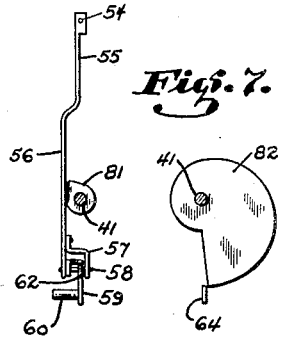
Fig. 6
Fig. 7.
INVENTOR.
Birger H. Duvander.
BY
Townsend & Loftus.
ATTORNEYS.

Patented Apr. 14, 1936

2,037,409

UNITED STATES PATENT OFFICE 2,037,409

RELATIVE HUMIDITY AND TEMPERATURE RECORDING APPARATUS

Birger H. Duvander, Berkeley, Calif.

Application March 7, 1934, Serial No. 714,482

3 Claims. (Cl. 73—24)

This invention relates to an apparatus whereby the solution of almost any problem involving the ratio or the product of one or more variables is made possible.

The object of the invention is to generally improve and simplify the construction and operation of apparatus of the character described, and more specifically stated, the invention embodies a pair of cams having a surface laid out in accordance with the logarithmic scale, means for rotating the cams individually or in unison, and means for translating the individual or combined movements of the cams to actuate an indicator which is movable over a logarithmic chart upon which the answer is readable.

In the present instance the invention is shown in conjunction with apparatus for determining relative humidity and temperature of a body of air, gas, or a like medium.

The drawings illustrate one form of the invention, in which—

Fig. 3 shows a wiring diagram of the temperature recording circuit.

Fig. 4 is a perspective view of one of the motion translating mechanisms employed in conjunction with the recording apparatus.

Fig. 5 is a central vertical cross section of the same.

Fig. 6 is a side elevation of the arm and cam whereby the clutch fingers are thrown into and out of operation.

Fig. 7 is a side elevation of one of the driving cams.

The recording apparatus is based upon the determination of absolute humidity by the thermal conductivity method and a gas analyzing circuit, together with a temperature recording circuit, is required for actuation of the apparatus whereby the relative humidity and temperature of a body of air, gas or a like medium is recorded.

The gas analyzer

Figure 2:
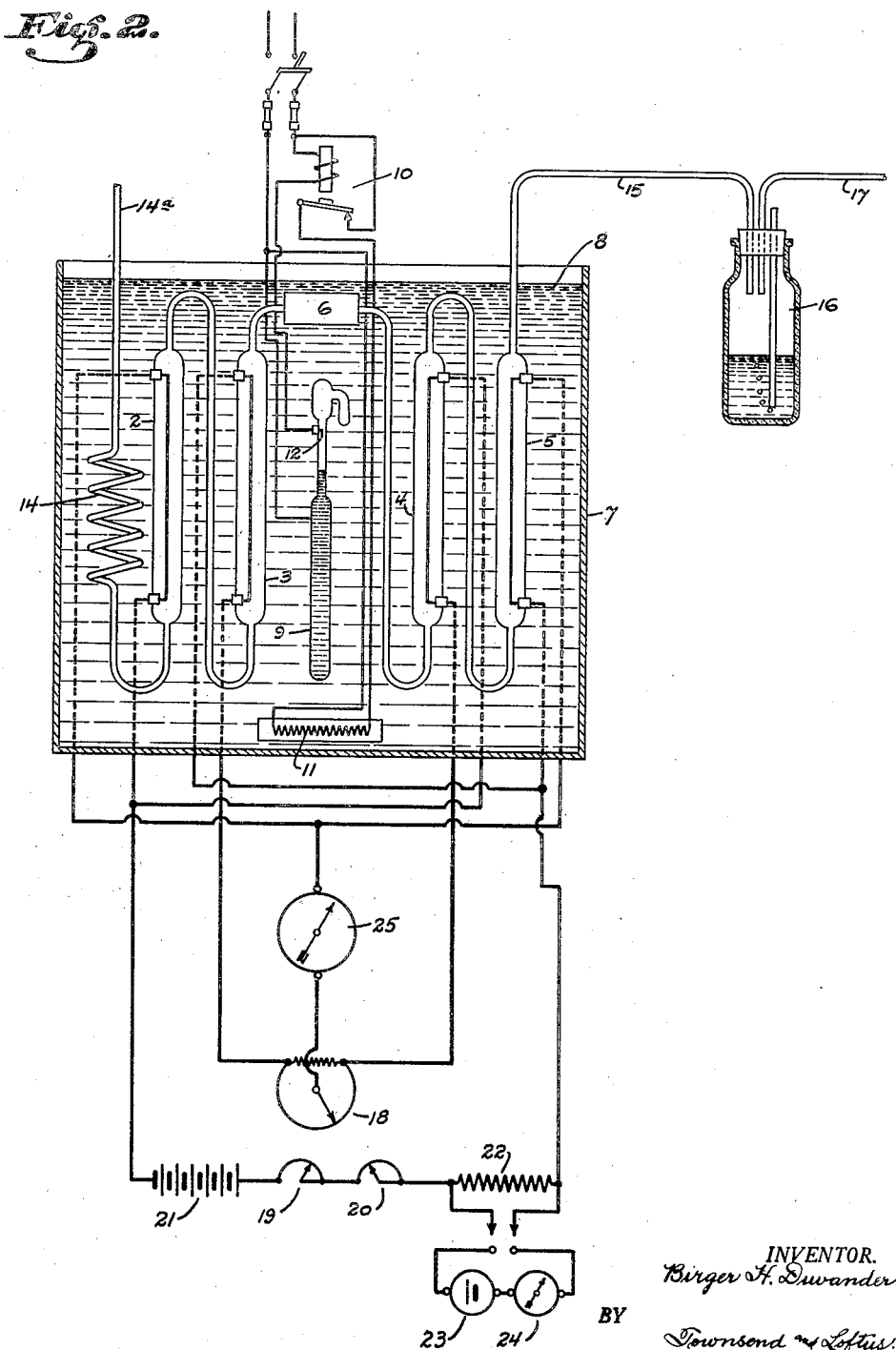
Fig. 2 is a central vertical sectional view of the gas analyzer and the electric circuit employed in conjunction therewith.

The gas analyzer is best shown in Fig. 2. It discloses a thermal conductivity bridge circuit which is the essential feature for determining absolute humidity. In this circuit are employed four tubes, indicated at 2, 3, 4 and 5. The tubes 2 and 3 will hereinafter be referred to as the analyzing tubes, and the tubes 4 and 5 as the standard tubes. The tubes are connected in series by pipes, as shown, and between them is interposed a drier 6 containing a dehydrite of any suitable character to insure thorough drying of the air or gas to be analyzed before it enters the standard tubes. Each tube contains a fine platinum resistance wire and these wires constitute the arms of a Wheatstone bridge. The tubes are mounted in a tank, generally indicated at 7, and this is filled with oil or a similar medium, indicated at 8, which maintains the tubes and their connections submerged. The oil is maintained at a constant temperature by a mercury actuated thermostat 9. When the temperature drops below a predetermined point the contact point in the thermostat breaks the circuit and a normally closed relay 10 is deenergized and closes a circuit through a heating element 11. When the temperature of the oil rises beyond a predetermined point the thermostat contact 12 will close and the relay will accordingly be energized and break the circuit.

The air or other medium to be analyzed passes through a heating coil 14, then through the analyzing tubes 2 and 3, then through the drying chamber 6 and finally through the standard tubes 4 and 5. These are connected through means of a pipe 15 with a balancing chamber 16, and this is, in turn, connected with a vacuum pump, or the like, through pipe 17 which maintains a constant and continuous flow of air or gas through the heater, the tubes and the drier just described.

In conjunction with the arms of the Wheatstone bridge a zero balancing slide wire 18 is employed and this is shunted and provided with a resistance coil. 19 and 20 indicate coarse and fine battery current rheostats, and 21 a battery. The current is adjusted to the proper value by balancing the potential drop across a coil 22 against that of a standard cell or battery 23, using a small reflecting galvanometer 24 as in index of the balance point. If current from the battery 21 is passed through the bridge network, the fine platinum wires in the gas analyzing tubes are heated. It is assumed that dry air is passing through the tubes 2, 3, 4 and 5 and that the bridge is balanced by proper adjustment of the slide wire 18. Now if air of a higher thermal conductivity, containing water vapor for example, is passed through the tubes 2 and 3, the temperature of the resistance wires passing therethrough will decrease as the heat generated in the same will be conducted away from the resistance wires at a higher rate owing to the higher thermal conductivity of the air-water vapor mixture passing through the tubes. As the temperature of the resistance wires passing through the tubes 2 and 3 decreases, the resistance also decreases and the bridge becomes unbalanced. The galvanometer, indicated at 25, will then deflect and it will be necessary, in order to balance the bridge circuit, to adjust the slide wire 18. In the present instance the adjustment of the slide wire 18 to rebalance the circuit is automatically accomplished and will hereinafter be described. As previously stated, the air passing through the analyzing tubes 2 and 3 is first heated in the coil 14. This coil is of a size sufficient to heat the air to the temperature of the oil bath in which it is submerged. The temperature of the oil bath is fixed at a point well above the maximum temperature of the air or gas to be analyzed and it is thus possible to determine the absolute humidity of the air passing through the analyzing tubes as air entering below the temperature of the oil bath is first heated and then analyzed, thus making the determination of absolute humidity over a given range independent of temperature.

Temperature recording circuit

The electric circuit of the temperature recorder 30 is best shown in Fig. 3. The recorder is fundamentally a self-balancing potentiometer. It is of the split circuit slide wire type, and is provided with an automatic reference junction compensator. A battery 26 supplies a continuously flowing current to the potentiometer circuit; the current being maintained constant by a rheostat 27. With the battery 26 in constant use the voltage will obviously change as deterioration takes place and the current in the potentiometer circuit will also change. To compensate for such change a portion of the battery voltage is compared at intervals with the constant voltage of a standard battery or cell 28 which is connected in circuit with the rheostat 27 whereby the current flow may be properly adjusted. This is accomplished by depressing a key 29 which connects a galvanometer 30 in series with the standard cell 28 across a resistance 31. If the voltage across the resistance 31 is not equal to the voltage of the standard cell 28, the galvanometer 30 will deflect from its zero position in which case the rheostat 27 should be adjusted until the galvanometer returns to its zero position. When properly adjusted the two voltages will be equal and opposite and the proper current will flow.

The unknown electromotive force is measured by completing a circuit at 29 and moving the contact 33 along the slide wire 34—35 until the galvanometer 30 returns to its zero position. With such an adjustment the electromotive force of the potentiometer across 36 and 33 will be equal and opposite to the electromotive force from the thermo-couple 37. Automatic compensation for the reference junction is obtained with the coil 38 which is located at the reference junction of the thermo-couple 37. The resistance of this coil varies with the reference junction temperature. This causes the electromotive force of the potentiometer across 36 and 33 to automatically vary and exactly compensate for any change in the electromotive force of the thermo-couple due to a change in the reference junction temperature, therefore the position of the contact 33 at a given temperature will not change with variations in temperature at the reference junction of the thermo-couple. Other means must be provided for imparting movement to the contact 33 along the slide wire 34—35. In the present instance this is performed automatically as will hereinafter be described.

The recording apparatus

Figure 1:
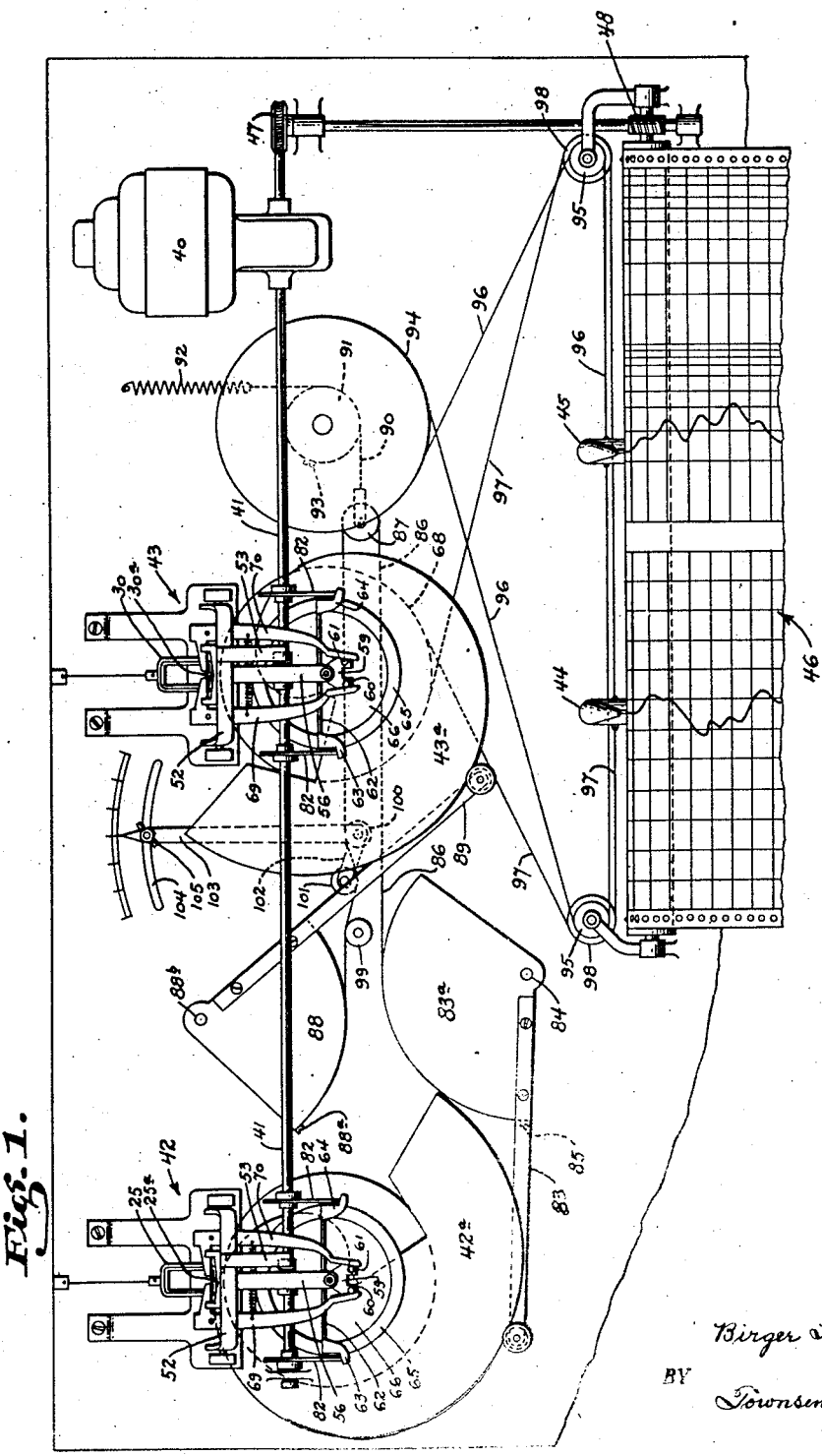
Fig. 1 is a front view of the recording apparatus.

The recording apparatus proper is best illustrated in Fig. 1. It is purely mechanical in operation and is continuously driven by a synchronous electric motor 40, or the like, through a longitudinally extending drive shaft 41. Power from shaft 41 is transmitted through a pair of motion translating mechanisms, indicated at 42 and 43. These, in turn, transmit a rotational movement to a pair of cams 42a and 43a and from the cams motion is transmitted to a pair of recording pens or stylus members, indicated at 44 and 45, and produces a visible record on a continuously moving chart 46 driven from the motor 40 through a gear train indicated at 47 and 48.

The motion translating mechanism, indicated at 42, is controlled by the gas analyzing circuit and, more specifically stated, through the galvanometer 25 actuated by the gas analyzing circuit. The function of the motion translating mechanism indicated at 42 is two-fold; first that of actuating or rebalancing the Wheatstone bridge circuit in the gas analyzer, and secondly that of cooperating with the motion translating mechanism indicated at 43 to actuate the stylus 45 whereby relative humidity is indicated and recorded.

The motion translating mechanism, indicated at 43, is controlled by the temperature recording circuit, and more specifically stated, by the galvanometer 30 actuated by said circuit. The function of the motion translating mechanism 43 is three-fold; first, that of actuating the contact 33 whereby the potentiometer circuit of the temperature recording circuit is rebalanced; secondly, that of cooperating with the motion translating mechanism 42 to actuate the stylus 45 whereby relative humidity is indicated and recorded; and third, that of actuating the stylus 44 whereby temperature is indicated and recorded.

The motion translating mechanisms, indicated at 42 and 43, are identical in construction and operation and description of one should accordingly suffice. The motion translating mechanism is best illustrated in Figs. 4 to 7, inclusive. The mechanism is supported by a case or back plate 50 and is constructed as follows: Pivotally mounted as at 51—51 is a U-shaped rocker arm 52 which is provided with a downwardly extending actuating arm 53. Pivotally supported with relation to the back plate as at 54 is a triangular-shaped plate 55 provided with a downwardly extending arm 56. Secured to the lower end of said arm is a bracket 57 and pivoted at 58 between the arm 56 and the bracket 57 is a triangular-shaped plate 59, on the lower end of which is mounted two pins 60 and 61, and on the upper end of which is secured a transversely extending cross arm 62, on the outer ends of which are secured friction gripping fingers 63 and 64 which cooperate with the rim 65 of a wheel 66 to transmit rotational movement thereto. The wheel 66 is secured on a shaft 67, which is journaled in and extends through the back plate 50. The cam shown at 42a is secured on the shaft 67 of the motion translating mechanism indicated at 42. The similar shaft 67 shown in the motion translating mechanism indicated at 43 also carries a wheel 66 and besides that a cam 43a and a pulley 68. Again returning to Fig. 4, it will be noted that the triangular-shaped plate 55 which is pivoted at 54 supports two rocker arms generally indicated at 69 and 70. The upper ends of these arms lie parallel and slightly above the upper edge of the U-shaped rocker arm 52. The lower ends of the rocker arms 69 and 70 engage with the pins 60 and 61. The rocker arms 69 and 70 are pivotally attached to the plate 55, as indicated at 72—72, and rocking motion will be transmitted to one or another of the rocker arms as will hereinafter be described. The galvanometer, indicated at 25, is provided with a forwardly projecting pointer or arm 25a. When the particular circuit in which the galvanometer is mounted is balanced, arm 25a will lie intermediate the upper ends of the rocker arms 69 and 70 and no function will be performed but if the circuit, in which the galvanometer is mounted, is unbalanced arm 25a will swing to one side or the other in under the rocker arms 69 and 70, as clearly illustrated in Fig. 4, in which instance it is shown as swung to the left. When this happens rotational movement will be transmitted to the wheel 66 and the shaft 67 to which it is secured and rotational movement will also be transmitted to the cams 42a and 43a and the other members mounted on the shaft 67. This is accomplished as follows: It was previously stated that the synchronous motor 40 transmitted continuous movement to drive shaft 41. This shaft is clearly shown in Figs. 4 and 5. On the shaft is secured four cams, one indicated at 80, a second at 81, a third and fourth at 82—82. The last two cams are identical in shape and their function will be described. During each revolution of shaft 41, the cams 80, 81 and 82 will also make a complete revolution. During the beginning of a revolution cam 81 will first act as it will engage the arm 56 and swing it about its pivot 54 in a direction outwardly from the wheel 66 and as the arm 56 carries the bracket member 57, the triangular plate 59, and the transverse cross arm 62, these members will be moved outwardly with relation to the face of the wheel 65. Cam 80 will next act. It cooperates with the arm 53 as it engages the same and when it does engage said arm the U-shaped arm 52 will swing upwardly in its pivotal supports 51—51. If the pointer or arm 25a of the galvanometer 25 assumes a position midway between the rocker arms 69 and 70 nothing will happen when the U-shaped arm 52 is raised upwardly by the cam 80 but if the pointer or arm 25a has swung to one side, as shown in Fig. 4, rocker arm 69 will be swung about its pivot 72 as arm 25a rests on the outer edge of the U-shaped arm 52 and is interposed between said arm and the upper lateral or right angular extension of the arm 69. A rocking motion will accordingly be transmitted to the arm 69 about its pivot 72, and it will assume the position shown in Fig. 4, and when it is so rocked it will engage the pin 60 and thereby rock the triangular-shaped plate 59 and the transverse cross arm 62 secured thereto. This rocking motion, however, takes place while arm 56 is still engaged by the cam 81. In other words when the cross arm and the clutch fingers 63 and 64 are swung away or outwardly with relation to the face of the wheel 65. The moment, however, that rocking motion has been transmitted to one or another of the rocker arms 69 or 70, cam 81 will move out of engagement with the arm 56 and the transverse cross arm and the clutch fingers 63 and 64 will swing back and into engagement with the face of the wheel 66. Cam 80 will also release arm 53 and thereby permit the U-shaped arm 52 and rocker arm 69 to return to normal position. At this point one or another of the cams 82 will engage the high point of the transverse cross arm 62, or that indicated at 64 on the right hand side, and when so engaged the transverse clutch arm will be swung back to horizontal position and during this swinging movement it will transmit a rotational movement to the wheel 66, see Fig. 4, as the clutch fingers 63 and 64 are at that time in engagement with the face of the wheel. Before the revolution of the driving shaft 41 is completed cams 82 will move out of engagement with the cross arm and all of the mechanism will have returned to normal position and the galvanometer will also return to normal position where the arm 25a stands midway between the rocker arms 69 and 70 as the rotational movement transmitted to the wheel 66 and the shaft 67 will at the same time have been transmitted to rebalance the circuit in which the galvanometer is connected. It being understood that the shaft 67 of the motion translating mechanism, indicated at 42, will actuate the movable contact of the slide wire 18 so as to rebalance the Wheatstone bridge circuit in the gas analyzer and that shaft 67 will at the same time transmit a rotational movement to the cam 42a. It should also be understood that when rotational movement is transmitted to the shaft 67 of the motion translating mechanism, indicated at 43, that motion will be imparted to the adjustable contact 33 whereby the balance in the potentiometer circuit is re-established and also that motion will be transmitted to the cam 43a and to the pulley 68.

The function of the apparatus, as already stated, is that of indicating and recording the relative humidity and temperature of air, gas, or a like medium. Relative humidity is the ratio of the quantity of vapor actually present in a given weight at a given temperature to the quantity of vapor which would saturate the same weight at the same temperature. The higher the temperature the greater the quantity of water vapor which a given volume of air (strictly speaking, of space) can hold. On a cold day 32° F. two grains of vapor saturates a foot of air, on a hot day 100° F. twenty grains; the barometer reading 30 in. on both days. If saturated atmosphere is drawn from outdoors on a freezing day and heated to 100° F. its humidity (absolute) will remain the same but it will hold one-tenth of the humidity required for saturation at the higher temperature. It will feel dry because its relative humidity will be low. It will have a relative humidity of ten percent. This difference or deficiency, as it is sometimes called, is the true result of evaporating power. In engineering practice, as well as in the scientific laboratory, relative humidity is expressed as a percentage, one hundred percent being the saturation point. The equation for relative humidity is—

$$R = \frac{W'}{W}$$

where

R = relative humidity in per cent.

W' = absolute humidity. Weight of water vapor per pound of air at $t$.

W = weight of water vapor at saturation point at $t$.

$t$ = dry bulb temperature.

W' is determined by the thermal conductivity method as explained under the gas analyzing circuit. W can be found in steam tables for the required dry bulb temperature. The problem is accordingly that of solving the equation $$\frac{W'}{W}$$

This is accomplished in the present instance by the apparatus disclosed which, in reality, is nothing more or less than a mechanical calculator employing a pair of cams, such as indicated at 42 and 43. The faces of these cams are laid out according to a logarithmic scale. Log $R$ = log $W'$ − log $W$. Referring to Fig. 1 of the drawings, the cam 42a is made to rotate in accordance with the absolute humidity present in the air. The absolute humidity is determined by the thermal conductivity method, as already explained in conjunction with the gas analyzing apparatus. The cam 42a, when it is rotated a certain amount of degrees actuates a rocker arm 83 which moves proportional to the logarithm of the absolute humidity. The arm is attached to a sector 83a pivoted at the point indicated at 84. This sector has fastened at the point 85 a steel wire or cord 86 and this passes over a pulley 87, and it then returns and is fastened to a sector 88 at the point 88a. The cam 43a is made to rotate in accordance with the dry bulb temperature. As long as the weight of water vapor per pound of air at the saturation point is entirely dependent upon temperature, it is possible to make the cam 43a of such a shape that it advances the rocker arm 89 a certain amount of degrees proportional to the logarithm of W at a given temperature. The motion of arm 89 is transmitted to the sector 88 which is pivoted at 88b. It will be pointed out that the sector 83a pulls the lower part of the wire 86 to the left for increasing W', or absolute humidity, and that the cams 42a and 43a move clockwise for increasing temperature and absolute humidity at saturating point. The movement of the arm 89 allows the upper part of the wire 86 to pull to the right for increasing W, or weight of water vapor at saturation point at dry bulb temperature, and as the wire runs over the block or pulley 87 movements of the upper and lower parts of the wire or cord are transmitted to the pulley. The pulley will, accordingly, move proportionate to the difference of movement in the arms 83 and 89. The movement of the sector 88 is then proportional to log W. The movement of the sector 83a is proportional to the log W', and the movement of the pulley 87 will accordingly be proportional to log W' minus log W. From the equation we see that this is the log of relative humidity. The movement of the pulley 87 is transmitted through a wire 90 which is wound around a pulley 91 and finally secured to a spring 92, the wire being secured against slippage about the pulley 91 by a set screw 93. Combined with the pulley 91, or secured thereto so as to rotate in unison therewith, is a pulley 94, and reeved around said pulley and a pair of pulleys 95 disposed at the opposite ends of the recorder 46, is an endless cable 96 which is secured to the stylus 45. A similar pulley 68, is secured to the shaft 67 of already described, is secured to the shaft 67 of the motion translating mechanism, indicated at 43, an endless cable 97 is reeved around this pulley and end pulleys 98 disposed at opposite ends of the recorder 46. The cable 97 is secured to the stylus 44, hence if pulley 68 is rotated motion will be transmitted to the stylus 44 and if the pulley 94 is rotated motion will be transmitted to the stylus 45.

For adjustment purposes an assembly consisting of a pair of fixed pulleys 99 and 100 and a movable pulley 101 is employed. The upper run of the wire 86 runs over and under the pulleys 99, 100 and 101, the pulley 101 is maintained on the outer end of a lever arm 102 and this may be adjusted by an extension arm 103 movable in the slot 104 and adapted to be secured therein by a clamping screw 105. By moving the extension arm 103 to the right or to the left, wire 86 is either lengthened or shortened, thus making adjustments possible.

For the purpose of describing the operation of the apparatus as a whole, let it be assumed that the apparatus is connected with a drier of the tunnel type, such as used for drying fruits, vegetables, and like commodities. In driers of this type a circulating fan maintains a continuous flow of drying air through the tunnel and the commodity to be dried is placed on trays in stacked formation in the tunnel in such a position that the air will come in contact with the commodity and cause drying of the same. In actual operation it is desirable to know and to maintain a continuous record of the air temperature and the relative humidity of the same, and as this is the case pipe 14a of the gas analyzer shown in Fig. 2 will be connected with the tunnel so that air may be continuously withdrawn and analyzed as the drying operation proceeds. Thermo-couple 37 will be placed at a convenient point within the tunnel so as to continuously indicate the temperature of the air. With the apparatus connected with the drier as described, the operation will be as follows:

If the relative humidity of the air and the temperature remain constant nothing will happen except that the recorder 46 will indicate and record the actual relative humidity and temperature. If the relative humidity increases or decreases the Wheatstone bridge circuit in the gas analyzer will become unbalanced, the galvanometer 25 will immediately deflect or cause the indicating arm 25a to swing to one side or another, thereby causing actuation of the motion translator indicated at 42; the cam will accordingly rotate in one direction or the other and this movement will be transmitted through arm 83 to swing the sector 83a about its pivot 84. This, in turn, will impart movement to the wire or cord 86 and rotational movement will accordingly be transmitted to the pulley 94 through pulley 91 and as the cord 96 is reeled around the same and also around the pulleys 95 and is, furthermore, connected with the stylus 45, movement will be imparted to the stylus and change in relative humidity will not only be indicated but recorded. It will be noted that the right hand side of the chart carried by the recorder is ruled according to a logarithmic scale, hence the actual percentage relative humidity will be indicated and recorded.

At the same time that cam 42a was rotated due to the unbalancing of the Wheatstone bridge circuit rotational movement was transmitted to the shaft 67, and as this is connected with the adjustable slide member 18 connected in the Wheatstone bridge circuit, said circuit will be automatically re-balanced and it will remain in a balanced condition until the relative humidity changes, and such change will of course again cause actuation of the motion translator 42 with a consequent change in the position of the stylus 45.

If the temperature of the air passing through the tunnel increases or decreases the thermocouple will cause unbalancing of the potentiometer circuit. The galvanometer 30 will deflect thereby causing the pointer or arm 30a of the galvanometer to swing to one side or another, thereby causing actuation of the motion translator indicated at 43. Shaft 67 will be rotated in one direction or another and so will the cam 43a and the pulley 68. The rotational movement of the pulley 68 is transmitted through a cord 97 to actuate the stylus 44, causing the temperature change to be indicated and recorded on the left hand side of the chart carried by the recorder. While the rotation of the cam 43a will impart movement to the arm 89, thereby causing the sector 88 to swing about its pivot 88b this movement will, in turn, be transmitted through the upper run of the wire 86 and rotational movement will be imparted to the pulleys 91 and 94 causing the stylus 45 to assume a new position. The relative humidity will obviously change with change in temperature even though the absolute humidity has not been changed. For this reason the movement is transmitted to the stylus 45 with rotation of shaft 67 of the motion translator 43. The adjustable member 33 of the slide wire 34 in the potentiometer circuit will return to re-balance the circuit and the potentiometer circuit and the circuit will remain balanced until the temperature again changes.

Individual operation of the motion translators 42 and 43 independently of each other have been described. In actual operation both may be simultaneously actuated and in that case motion may be transmitted to the stylus 45 or it may not. For instance, the cam 43a may swing in one direction while the cam 42a may swing in the opposite direction an equal amount, for the simple reason that the change in temperature and the change in absolute humidity offset each other, causing the relative humidity to remain the same. Again it is possible that both cams might rotate in the same direction and, in that case, movement would be transmitted to the stylus 45, hence the cams may move in unison in the same direction, they may move in opposition to each other, and one or the other may move entirely independent of the other.

In addition to the description submitted it should be noted that the calculating portion of the apparatus may be used for the solution of almost any problem where it is desired to calculate either the ratio or the product of one or more variables. This is possible due to the fact that a pair of cams are provided which are so constructed that they produce a motion proportional to the logarithm of the variable in question. The ratio is arrived at by mechanically subtracting the motion of the cams. By adding the motions of the cams the product is obtained. The result is accordingly the ratio or product wanted and it is directly readable on the logarithmic scale over which the pointer of the stylus 45 travels.

While the instrument as a whole has been described in conjunction with apparatus for determining relative humidity and temperature, it may be used for other purposes, for instance as a mean speed meter. In that instance, one cam would be driven by a clock or a like mechanism and the other would be driven in accordance with the mileage covered. The two cams will actuate their arms in proportion to the logarithms of the time elapsed and the mileage covered.

Mean speed = V
Time = T
Mileage = M $$V = \frac{M}{T}$$

and $\log V = \log M - \log T$

The movements of the two cams are subtracted and the resultant is a movement proportional to the log of V, this motion being transmitted to a pointer which moves over a logarithmic scale where the answer is directly readable.

Instead of connecting one of the cams to move with the mileage covered it could be connected to a flow meter or to the fuel stoker of a boiler and the apparatus may thus be utilized for indicating flow per hour, or tons of coal consumed per hour. It could also be connected as a kilo-volt ampere meter in which case it would add the logarithms for the voltage and for the current. In fact it can be used in conjunction with any instrument where it is desired to calculate either in product or the ratio of one or more variables.

When the apparatus is employed for the purpose of determining relative humidity and temperature of air, gas or a similar medium it might be stated that where theoretical or practical operation is concerned, its range is almost limitless as it covers a range that no other meter so far has arrived at. Its accuracy is solely dependent upon mechanical perfection and this is easily taken care of. It may, furthermore, be stated that theoretical combinations are not resorted to that would naturally limit its accuracy. The instrument or apparatus operates entirely independent of atmospheric pressure. The apparatus does not depend upon wet or dry bulb temperatures and as such does not change the relative humidity of the surrounding medium. In practice it can be used on any temperature below the freezing point and its limit upwards is only limited by the problem of maintaining the oil or air bath of the analyzing tubes at a sufficiently high temperature. The apparatus can be used as a non-recording meter by entirely eliminating the synchronous motor 40, the drive shaft 41 and the motion translating devices indicated at 42 and 43. In that instance when used as a non-recording meter it will only be necessary to rotate the cams 42a and 43a by hand to balance the electric circuits and readings of relative humidity and temperature could thus be taken as often as desired. All readings taken either at temperatures below zero or very much above the same can be depended upon and are accurate as the results are obtained by the thermal conductivity method.

Having thus described my invention, what I claim and desire to secure by Letters Patent is:—

1. In a device for measuring relative humidity, a cam rotatable upon temperature variations, a cam rotatable upon variations in absolute humidity independent of temperature, exhibiting means including a rotatable driving member, and means for transmitting rotational movement of either or both of said cams to said driving member.

2. In a device for measuring relative humidity, a cam rotatable upon temperature variations, a cam rotatable upon variations in humidity, exhibiting means including a rotatable driving member, a pair of pivoted arms engageable one with each of said cams for swinging movement upon rotation of the cams, a pulley supported on a cord wound about said driving member, and a second cord passing over said pulley and secured at its ends relative to said arms whereby rotation of said cams may impart rotation to said driving member.

3. In a device for measuring relative humidity, a cam rotatable upon temperature variations, a cam rotatable upon variations in humidity, exhibiting means including a rotatable driving member, a pair of pivoted arms engageable one with each of said cams for swinging movement upon rotation of the cams, a pulley adjacent to the driving member, a cord secured to the pulley and wound about the driving member, spring means placing said cord under tension and tending to rotate the driving member in one direction, and a cord passing over said pulley and having its ends secured one to each of said pivoted arms whereby rotation of either one or both of said cams may impart rotation to said driving member.

BIRGER H. DUVANDER.